(12) United States Patent
Kringlebotn

(10) Patent No.: US 6,788,418 B1
(45) Date of Patent: Sep. 7, 2004

(54) METHOD AND APPARATUS FOR INTERROGATION OF BIREFRINGENT FBG SENSORS

(75) Inventor: Jon Thomas Kringlebotn, Trondheim (NO)

(73) Assignee: Optoplan AS, Trondheim (NO)

( * ) Notice: Subject to any disclaimer, the term of this patent is extended or adjusted under 35 U.S.C. 154(b) by 193 days.

(21) Appl. No.: 09/926,727

(22) PCT Filed: Jun. 15, 2000

(86) PCT No.: PCT/NO00/00208

§ 371 (c)(1),
(2), (4) Date: Jan. 23, 2002

(87) PCT Pub. No.: WO00/77562

PCT Pub. Date: Dec. 21, 2000

(30) Foreign Application Priority Data

Jun. 15, 1999 (NO) .............................................. 992912

(51) Int. Cl.⁷ ................................................ G01B 9/02
(52) U.S. Cl. ...................................... 356/477; 356/484
(58) Field of Search ............................. 356/477, 73.1, 356/484; 250/227.27

(56) References Cited

U.S. PATENT DOCUMENTS

| | | |
|---|---|---|
| 5,005,952 A | 4/1991 | Clark et al. |
| 5,680,489 A * | 10/1997 | Kersey .......................... 385/12 |
| 5,844,927 A | 12/1998 | Kringlebotn |

FOREIGN PATENT DOCUMENTS

WO         98/36252        8/1998

OTHER PUBLICATIONS

"Interrogation of an Integrated Optic Modulator Over a Low–Birefringence Fiber Using Polarization Tracking", Bulmer et al, IEEE Photonics Technology Letters, vol. 1, No. 2, Feb. 1989, pp. 35–37.

"Birefringence Effect of Optical Fiber Laser With Intracore Fiber Bragg Grating", Douay et al, IEEE Photonics Technology Letters, vol. 4, No. 8, Aug. 1992, p. 845.

"Simultaneous Strain and Temperature Sensing Using an Interferometrically Interrogated Fibre Bragg Grating Written in Bow–tie Fibre", Ferreira et al, SPIE–The International Society, vol. 3483, pp. 49–53.

* cited by examiner

Primary Examiner—Frank G. Font
Assistant Examiner—Patrick Connolly
(74) Attorney, Agent, or Firm—Moser, Patterson & Sheridan, L.L.P.

(57) ABSTRACT

A method for measurements of the orthogonally polarized minimum and maximum Bragg wavelengths of one of several birefringent fiber Bragg grate FBG sensors, and alternatively a method for eliminating errors in FBG sensor measurements caused by undesired grating birefringence, using an FBG wavelength interrogation apparatus, where the light from a polarized wavelength swept narrowband source (1) is passed through an electrically controllable polarization controller (2), operated in either a scanning mode or a tracking mode to find the two orthogonally polarized reflection spectra of the birefringent FBGs (6) with corresponding minimum and maximum Bragg wavelength $\gamma_{n_x}$ and $\gamma_{n_x}$, where a low-birefringent reference FBG with known wavelength (5) and a low-birefringent fixed Fabry-Perod interferometer (8), generating frequency equidistant peaks are used in combination to provide accurate and readable wavelength measurements.

11 Claims, 3 Drawing Sheets broadband source   tuneable filter   polariser

METHOD AND APPARATUS FOR INTERROGATION OF BIREFRINGENT FBG SENSORS

BACKGROUND

This invention relates to a practical method for accurate and high-resolution measurements of the orthogonally polarised reflected Bragg wavelengths from fibre Bragg grating (FBG) sensors with birefringence. A fibre Bragg grating (FBG) is a permanent, perodic refractive index modulation in the core of a single-mode optical silica glass fibre over a length of typically 1–100 mm, formed by transversly illuminating the fibre with a periodic interface pattern generated by ultra-violet laser light, e.g. from an Eximer laser, either by using a two-beam interferometer, as disclosed by G. Meltz et.al. in ["Formation of Bragg gratings in optical fiber by a transverse holographic method," Opt. Lett., Vol. 14, pp. 823–825, 1989,] or by illuminating the fibre through a periodic phase mask, as disclosed by K. O. Hill et.al in ["Bragg gratings fabricated in monomode photosensitive optical fiber by UV exposure through a phasemask," Appl. Phys. Lett., Vol. 62, pp. 1035–1037,1993.] An FBG reflects light within a narrow bandwidth, centred at the Bragg wavelength, $\lambda_B = 2n_{eff}\Lambda$, where $n_{eff}$ is the effective refractive index seen by the light propagating in the fibre, and $\Lambda$ is the physical period of the refractive index modulation. Outside the FBG bandwidth light will pass with negligible loss. If the fibre is birefringent the refractive index seen by light propagating in the two orthogonal polarisation eigenstates of the fibre, $n_x$ and $n_y$ will be different. Consequently, there will be two orthogonally polarised reflected spectra from the FBG with two Bragg wavelengths with a wavelength separation of $\Delta\lambda_B = 2B\Lambda$, where $B = n_x - n_y$ ($n_x > n_y$). Some birefringence can also be UV-induced through the writing of the grating.

It is known that the reflected Bragg wavelength from an FBG will change with any external perturbation which changes the effective refractive index seen by the propagating light and/or the physical grating period (fibre length), such as temperature and strain. By measuring the reflected Bragg wavelength, using for example a broadband light source and a spectrometer, an FBG can be used as a sensor for measuring such external perturbations. The bandwidth of the reflection spectrum from an FBG sensor is typically 0.1–0.3 nm (~10–30 GHz).

An external perturbation can also change the birefringent in the fibre, and hence change the wavelength separation between the two orthogonally polarised reflection spectra. This can be exploited to make a sensor where the wavelength splitting is a measure of an external perturbation, such as temperature, strain, or pressure, which directly or indirectly induces extra birefringence in the fibre. Such a sensor can also allow simultaneous measurement of two measurands, such as temperature and pressure/strain, by measuring both the wavelength splitting and the absolute wavelengths (or average wavelength). Various birefringent FBG sensors are disclosed in [U.S. Pat. No. 5,399,854 to Dunphy et.al., U.S. Pat. Nos. 5,591,965, 5,828,059, 5,869, 835, all to Eric Udd, and U.S. Pat. No. 5,841,131 to Schroeder and Udd), and in [Sudo, M. et.al., "Simultaneous measurement of temperature and strain using PANDA fiber grating", Proc. 12$^{th}$ International Conf. on Optical Fiber Sensors," p. 170–173, 1997]. Interrogation of birefringent FBG sensors has been based on using sensors with sufficient birefringence to cause a splitting of the two reflection peaks which can be resolved by the interrogating spectrometer.

It is known that one or several reflected FBG sensor wavelengths can be measured using a broadband source, for example an edge-light-emitting diode (ELED) or a superfluorescent fibre source (SFS), in combination with a tuneable optical filter, for example a piezoelectric transducer (PZT) tuneable fibre Fabry-Perot filter [Kersey, A. D. et.al., "Multiplexed fiber Bragg grating strain-sensor system with a fiber Fabry-Perot wavelength filter", Optics Letters, Vol. 18, pp. 1370–1372, 1993], or alternatively a tuneable laser source [U.S. Pat. No. 5,401,956 (Mar. 28, 1995)], provided the source spectrum covers all possible FBG sensor wavelengths. To obtain accurate, repeatable wavelength measurements with these techniques one can use a reference scheme based on the use of a fixed Fabry-Perot filter and a reference FBG with separate detector channels [Norwegian patent No 307357]. There are also various other techniques for wavelength interrogation of FBG sensors with broad band sources, such as edge filtering, interferometric detection and direct spectroscopic detection [Kersey, A. D., et.al., "Progress towards the development of practical fiber Bragg grating instrumentation systems," Proc. SPIE, Vol. 2839, 1996].

With standard low-birefringent FBG sensors, inherent or induced birefringent can result in measurement errors caused by the corresponding splitting of the orthogonally polarised FBG reflection spectra. Unwanted birefringence can for example be induced when FBG sensors are embedded in a composite structure. Normally, this splitting is smaller than the reflection bandwidth of the FBG. In an interrogation system with a partly polarised source such as an ELED or a polarised tuneable laser, and/or polarisation dependent components, the randomly varying birefringence in the lead fibres between the readout instrumentation and the sensors will cause variations in the relative reflected power in each of the two orthogonal FBG spectra, and hence variations/errors in the measured Bragg wavelengths. Polarisation scrambling techniques have been demonstrated which reduces these birefringence induced measurement errors [Ecke, W., et.al., "Improvement of the stability of fiber grating interrogation systems using active and passive polarization scrambling devices", Proc. 12$^{th}$ International Conf. on Optical Fiber Sensors," p. 484–487, 1997]. Alternatively, one can use an unpolarised source such as an SFS and a system with no polarisation dependant components. However, if the wavelength splitting due to birefringence in the FBG sensor occasionally becomes large enough to significantly change the spectra shape of the reflected spectrum or cause two resolved separate peaks this can give problems for the readout instrumentation and give erroneous results.

Birefringent FBG based two polarisation fibre laser sensors disclosed with a distributed feedback (DFB) fibre laser in the Norwegian patent No. 302441 to J. T. Kringlebotn, are attractive for high resolution measurements of birefringence inducing measurands. The laser light at the two orthogonally polarised eigenstates of the laser are mixed in a detector, generating an electrical beat frequency which is a measure of the birefringence induced in the laser sensor by the measurand.

Objects

The main object of the invention is to provide a method for accurate and high-resolution measurements of the orthogonally polarised maximum and minimum reflected Bragg wavelengths from fibre Bragg grating (FBG) sensors with birefringence, using a Bragg wavelength readout system based on a broadband source or alternatively a tuneable laser source. The aim is to provide a readout system which can measure birefringence-induced splitting of Bragg wavelengths with high resolution and accuracy (ca. 1 pm), independently of the magnitude of the splitting. A splitting larger than the FBG bandwidth will hence not be required.

A second objective is to provide a means for eliminating errors in FBG sensor measurements cause by the grating birefringence in combination with an interrogation system with a partly or fully polarised source and/or polarisation dependent components, independently of the magnitude of grating birefringence and degree of source polarisation.

A third objective is to provide a means for eliminating signal fading and optimise the signal amplitude of birefringent FBG based two polarisation fibre laser sensors.

Invention

The object of the invention is achieved with a method having features as stated in the characterising part of claim 1. Further features are stated in the dependent claims. The main part of the invention comprises the use of an electrically controllable fibre optic polarisation controller in combination with an FBG wavelength readout instrumentation system to measure the wavelength splitting of one or several wavelength multiplexed birefringent FBG sensors. The polarisation controller is either i) operated in a scanning mode to cover a wide range of polarisation states in a certain time period, including the two orthogonal polarisation states corresponding to the minimum and maximum Bragg wavelengths or ii) operated in a tracking mode with electrical feedback from the receiver of the instrumentation system to change the polarisation states in order to track the minimum and maximum Bragg wavelengths of each FBG sensor. The scanning mode can either use random scanning or a programmed sequential scanning to cover a grid of polarisation states on the Poincarè Sphere. The measured minimum and maximum wavelengths provide a measure of the measurand induced birefringence, independently of the magnitude of this birefringence. The invention can in combination with a wavelength read-out unit with a proper wavelength reference system provide absolute measurements of both orthogonal Bragg wavelengths, which enables simultaneous measurements of two independent measurements, such as temperature and pressure.

The invention can also be used to eliminate errors in FBG sensor measurements caused by the grating birefringence in combination with an interrogation system with a partly or fully polarised source and/or polarisation dependent components, independently of the magnitude of grating birefringence and degree of source polarisation.

Finally, the method provides a means for eliminating signal fading and optimise the signal amplitude of one or several birefringent FBG based two-polarisation fibre laser sensors.

EXAMPLES

The invention is described with reference to the illustrations, in which

Figure 1A:
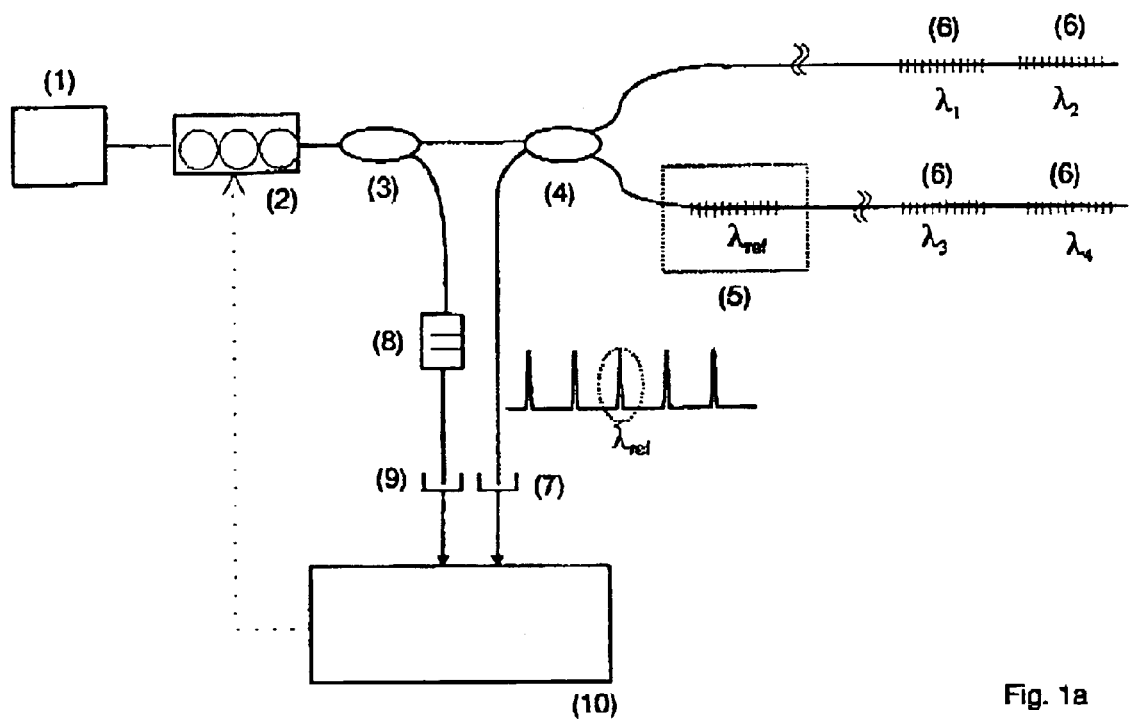
FIG. 1a shows a preferred embodiment of a wavelength measurement device for demultiplexing and demodulation of several birefringent FBG sensor wavelengths based on a polarised wavelength swept narrowband source in combination with an automatic polarisation controller.
Figure 1B:
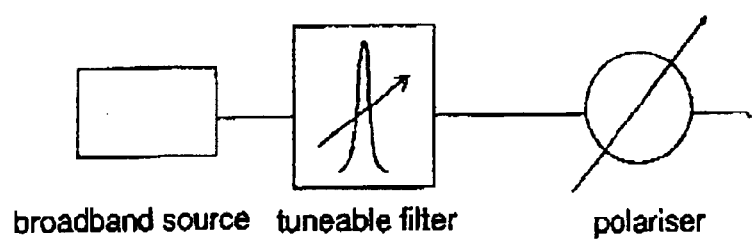
FIG. 1b shows one possible polarised wavelength swept narrowband source, based on a broadband source in combination with a tuneable optical filter and a polariser.

FIG. 1a shows a preferred embodiment of the wavelength measurement arrangement used for measuring the Bragg wavelengths of one or several wavelength multiplexed birefringent FBG sensors, based on a polarised wavelength swept narrowband source in combination with an electrically controllable fibre optic polarisation controller. The source can either be a tuneable, polarised laser or a broadband source in combination with a tuneable optical filter and a polariser, as shown in FIG. 1b. The arrangement includes a reference system based on a fixed Fabry-Perot filter in a separate branch with a separate detector, in combination with a reference FBG. The reference fixed Fabry-Perot filter and the reference FBG should have very low birefringence, with a birefringence induced wavelength splitting of <1 m.

Figure 2A:
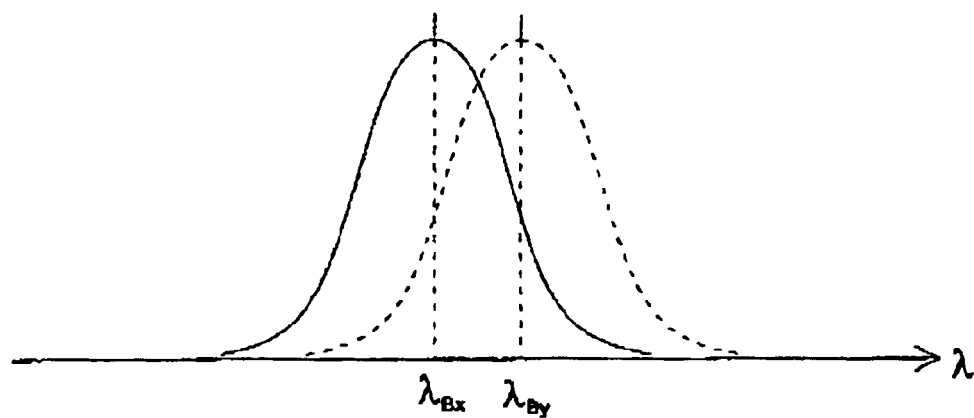
FIG. 2a shows a schematic illustration of the two orthogonally polarised reflection specta of an FBG.

The light from the polarised wavelength swept narrowband source (1) is passed through an electrically controllable polarisation controller (2), operated in either a scanning mode or a tracking mode to find the two orthogonally polarised reflection spectra of the birefringent FBGs with corresponding minimum and maximum Bragg wavelength, $\lambda_{Bx}$ and $\lambda_{By}$, as illustrated in FIG. 2a. The polarisation controller can for example be ETEK's FPCR fibre optic polarisation controller, which is based on multiple liquid crystal cells to rotate the incoming polarisation state to any other state through a combination of electrical drive voltages to the liquid crystal cells.

Figure 2B:
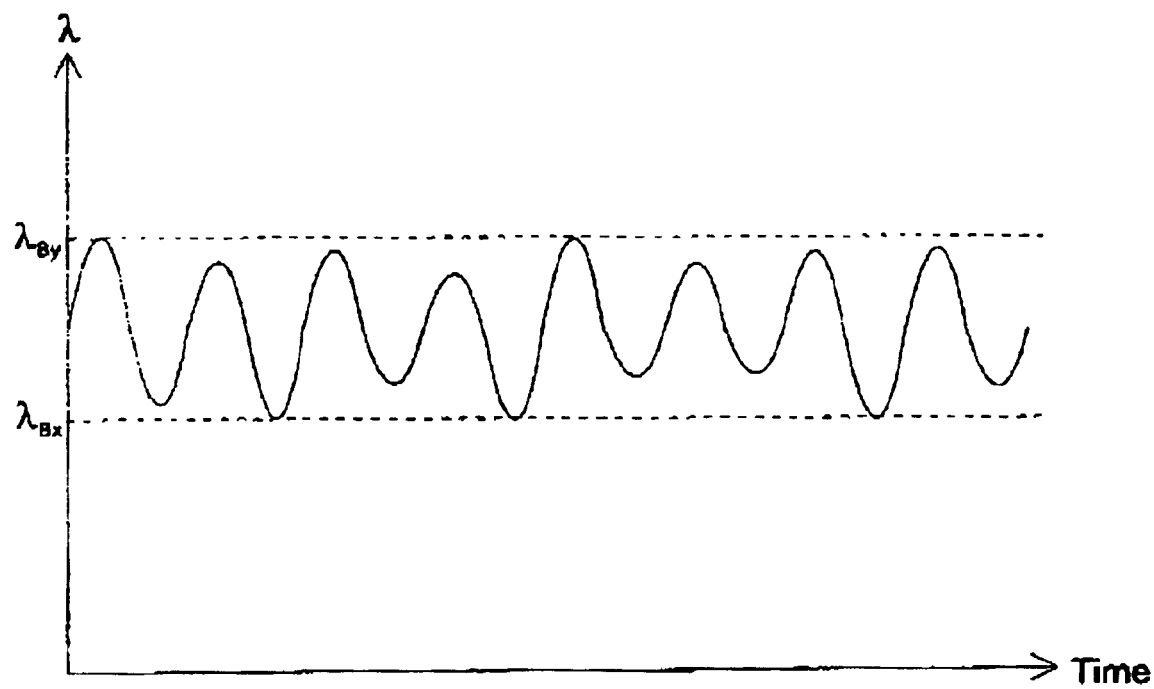
FIG. 2b shows the variation in measured Bragg wavelength of a birefringent FBG using a wavelength readout system based on a polarised source in combination with an automatic polarisation controller which is operated in a random scanning mode.

Referring to FIG. 1, the transmitted narrowband light is splitted in two by a fibre optic directional coupler (3). The main part of the light is passed onto the FBGs (6), including at least one FBG (5) with known wavelength, providing an absolute wavelength reference, via another directional coupler (4). The reflected light from the FBGs, occurring in time when the wavelength and polarisation of the narrowband filtered source light matches the orthogonally polarised Bragg wavelengths of the FBGs, is directed through the directional coupler (4) onto a detector (7). A smaller part of the splitted light is transmitted through a polarisation independent fibre F-P filter (8) with fixed and known free spectral range, which produces a reference comb spectrum at the output with peaks having a constant, known frequency separation equal to the free range to provide an absolute frequency/wavelength scale. The reference comb spectrum is passed onto a second detector (9). The signal from detector (7) and (9) are sequentially sampled, processed and compared in a signal processing and data presentation unit (10), providing accurate and repeatable information on the orthogonally polarised Bragg wavelengths of the FBGs. For each wavelength scan and subsequent wavelength measurement the polarisation state at the output of the polarisation controller is changed until the minimum and maximum wavelengths $\lambda_{Bx}$ and $\lambda_{By}$ are measured, as illustrated in FIG. 2b. In a tracking mode the measured wavelength is used to generate an electrical feedback signal to the polarisation controller which changes the polarisation state at the output until the maximum wavelengths are measured.

Figure 3:
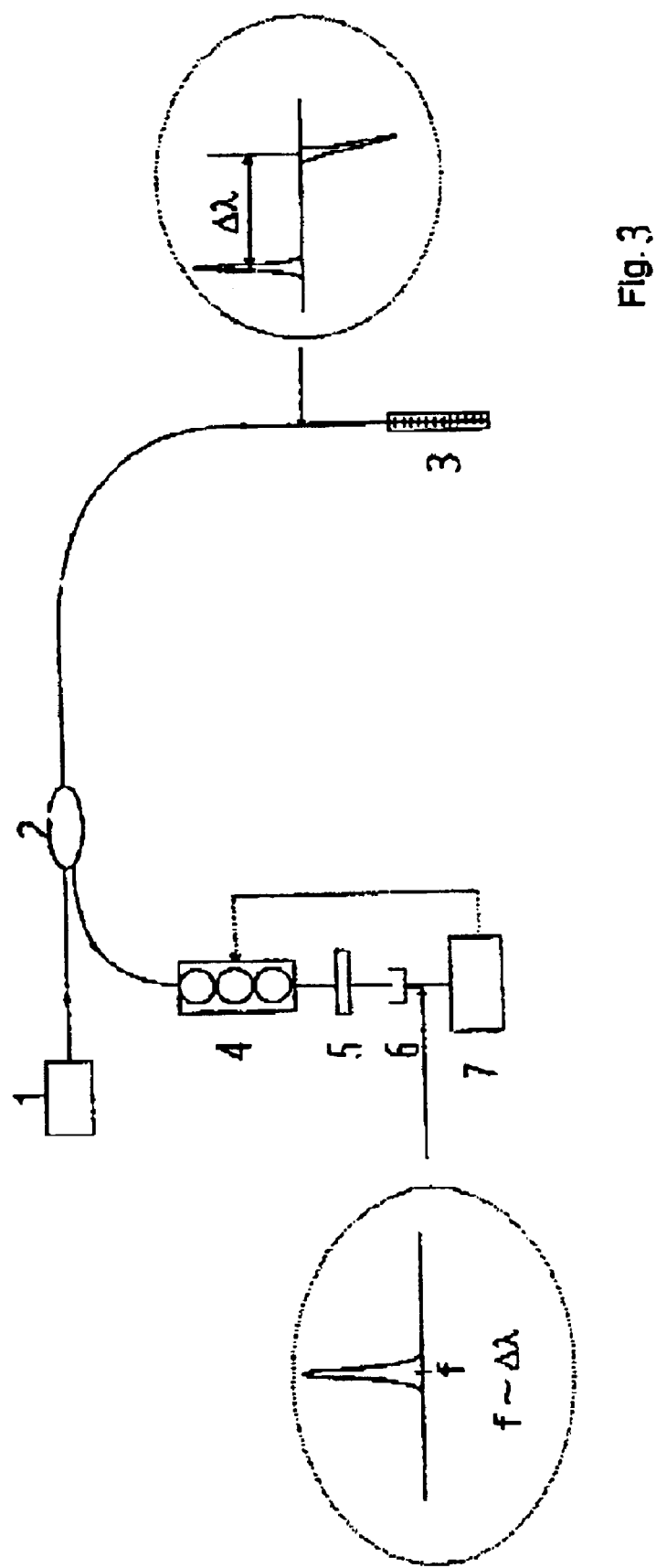
FIG. 3 shows a preferred embodiment of a measurement device for demodulation of a birefringent two-polarisation DFB fibre laser sensor using an automatic polarisation controller to optimise the beat signal between the two orthogonally polarised laser modes.

FIG. 3 shows a preferred embodiment of a measurement device for demodulization of a birefringent two-polarisation DFB fibre laser sensor using an automatic polarisation controller to optimise the beat signal between the two orthogonally polarised laser modes. Light from a pump laser (1) is launched through a fibre WDM coupler (2) via an optical fibre to generate lasing in one or several DFB fibre laser sensors (3) (the figure shows only one laser sensor). The generated narrowband laser light at two orthogonal polarisation states with a wavelength splitting Δλ, proportional to the means induced birefringence of the laser sensor, is directed through the WDM (2) via an automatic polarisation controller (4) and a linear polariser (5), onto a detector (6) to generate an electrical beat which is directly proportional to the measurand induced birefringence. The automatic, electrically driven polarisation controller (4), is either operated in a scanning mode to cover a wide range of polarisation states in a certain time period, or operated in a tracking mode with electrical feedback from the signal processing unit (7) of the instrumentation system to change the polarisation state, to align the two orthogonal polarisation states at 45° relative to the linear polariser (5) to maximise the electrical beat signal amplitude. It can also be cases when one is interested in minimising the electrical beat signal amplitude to generate single polarised laser light this can be done with the presented method.

What is claimed is:

1. A system for measuring orthogonally polarized Bragg wavelengths, comprising:
   a polarized light source;
   at least one birefringent fiber Bragg grating (FBG) sensor for reflecting the orthogonally polarized Bragg wavelengths;
   a polarization controller; and
   an FBG wavelength interrogation apparatus that measures the Bragg wavelengths of the at least one birefringent FBG sensor for determining a minimum and a maximum Bragg wavelength of each FBG sensor.

2. The system of claim 1, wherein the polarization controller scans a range of polarization states in a time period, the range includes two orthogonal polarization states corresponding to the minimum and maximum Bragg wavelengths.

3. The system of claim 1, further comprising a signal processing unit that provides feedback to the polarization controller to change the polarization state in order to track the minimum and maximum Bragg wavelengths of each birefringent FBG sensor.

4. The system of claim 1, wherein the polarized light source comprises a polarized laser.

5. The system of claim 1, wherein in the polarized light source comprises:
   a non-polarized source; and
   a polarizer.

6. The system of claim 1, wherein in the polarized light source comprises a tunable, polarized, narrowband laser.

7. The system of claim 1, wherein in the polarized light source comprises:
   a broadband source;
   a tunable narrowband optical filter; and
   a polarizer.

8. The system of claim 1, wherein the polarization controller comprises multiple liquid crystal cells capable of rotating an incoming polarization state to any other polarization state through a combination of electrical drive voltages to the liquid crystal cells.

9. A system for eliminating fading of a signal and optimizing the signal's amplitude, comprising:
   a light source;
   at least one birefringent, dual-polarization fiber Bragg grating (FBG) sensor that reflects two orthogonally polarized eigenstates with different wavelengths;
   a linear polarizer, wherein the two orthogonally polarized eigenstates pass therethrough;
   a polarization controller used to align the two orthogonally polarized eigenstates at forty five degrees relative to the linear polarizer thereby providing a beat signal with a maximum amplitude; and
   a detector for determining the beat signal frequency which is a measure of the signal.

10. The system of claim 9, wherein the polarization controller scans a range of polarization states in a time period, the range includes the two orthogonally polarized eigenstates that correspond to a minimum and a maximum wavelength of each FBG sensor.

11. The system of claim 9, further comprising a signal processing unit that provides feedback to the polarization controller to change the polarization state in order to track the two orthogonally polarized eigenstates that correspond to a minimum and a maximum wavelength of each FBG sensor.

* * * * *